US008694037B1

(12) United States Patent
Hartless

(10) Patent No.: US 8,694,037 B1
(45) Date of Patent: Apr. 8, 2014

(54) METHOD FOR IMPROVING RADIO PERFORMANCE IN A SIMULCAST ENVIRONMENT USING PHASE TILTED FILTERS

(71) Applicant: Harris Corporation, Melbourne, FL (US)

(72) Inventor: Mac L. Hartless, Forest, VA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 13/761,283

(22) Filed: Feb. 7, 2013

(51) Int. Cl.
H04B 7/00 (2006.01)
H04B 15/00 (2006.01)
H04B 1/10 (2006.01)

(52) U.S. Cl.
USPC .......................... 455/503; 455/307; 375/350

(58) Field of Classification Search
USPC ........ 455/503, 500, 501, 63.1, 296, 303, 307; 375/346, 349, 350
See application file for complete search history.

(56) References Cited

U.S. PATENT DOCUMENTS

| | | | |
|---|---|---|---|
| 4,363,129 A | 12/1982 | Cohn et al. | |
| 5,054,113 A | 10/1991 | Jasinski | |
| 5,307,515 A * | 4/1994 | Kuo et al. | 455/295 |
| 6,078,801 A * | 6/2000 | Souissi | 455/303 |
| 6,633,325 B1 | 10/2003 | Lee | |
| 8,095,086 B2 | 1/2012 | Noeske et al. | |
| 8,290,464 B2 * | 10/2012 | Bouillet | 455/296 |
| 2008/0232435 A1 * | 9/2008 | Wilson | 375/143 |
| 2012/0140759 A1 * | 6/2012 | Li et al. | 370/343 |

* cited by examiner

Primary Examiner — Nguyen Vo
(74) Attorney, Agent, or Firm — Fox Rothschild LLP; Robert J. Sacco; Carol E. Thorstad-Forsyth

(57) ABSTRACT

Method for optimizing the delay spread performance of a radio receiver (200) includes evaluating (306) a delay spread environment to determine if a desired RF signal is being received under conditions of low delay spread or high delay spread. If a low delay spread condition, the baseband digital data signal is filtered using a narrow filter (310). Otherwise, the signal is filtered using a wide bandwidth filter (312) having a bandwidth wider than the narrow filter. The center frequency of the wide bandwidth filter is selectively shifted (316, 320) in accordance with a predetermined frequency offset if a second received power level of an interfering signal in an adjacent channel exceeds the first received power level by a predetermined threshold amount. This frequency shift of the filter allows for improved delay spread performance while minimizing any performance degradation when an interfering signal is present on an adjacent channel.

16 Claims, 7 Drawing Sheets

METHOD FOR IMPROVING RADIO PERFORMANCE IN A SIMULCAST ENVIRONMENT USING PHASE TILTED FILTERS

BACKGROUND OF THE INVENTION

1. Statement of the Technical Field

The inventive arrangements relate to radio receiving equipment and more particularly to methods and systems for improving performance of a radio receiver operating in an simulcast communication environment.

2. Description of the Related Art

Simulcast communication systems have a plurality of transmitters that simultaneously broadcast identical data signals at the same frequency. The transmitters are positioned at geographically diverse locations such that a desired transmitted signal coverage is provided throughout a particular geographical area. Simulcast systems are useful for ensuring that a mobile communication unit will be able to receive a transmitted signal anywhere within a large or irregularly shaped geographic area.

Simulcast communication systems can experience time delay interference issues due to the fact that multiple transmitters are transmitting on the same frequency. Delay spread is a key parameter of such interference. Delay spread is most problematic when signals having a similar signal strength are received from two or more transmitters that vary greatly in their distance from the receiving unit. The large difference in distance can cause the signals from each transmitter to be received at the radio at slightly different times. Problems with delay spread can cause bit error rates to increase, leading to poor communications quality.

In a simulcast communication system with substantial amounts of delay spread, a mobile radio unit needs to have a relatively large receive bandwidth to optimize performance. While improving delay spread performance, a large receive bandwidth will degrade the ability of the receiver to reject adjacent channel interference. Accordingly, designers generally will select the widest receiver filter bandwidth which will meet required specifications for adjacent channel rejection (ACR) and then accept the resulting delay spread capability of the radio.

SUMMARY OF THE INVENTION

Embodiments of the invention concern a method for optimizing the delay spread performance of a radio receiver. The method includes receiving a desired RF signal on a main channel and demodulating the desired RF signal to extract therefrom a baseband digital data signal. A determination is made regarding the received power level of the desired RF signal on the main channel, and regarding the received power level of an interfering RF signal on either the upper or lower adjacent channel. The adjacent channels are offset in frequency by a predetermined channel spacing. A delay spread environment is evaluated to determine if the desired RF signal is being received under conditions of low delay spread or high delay spread using a measured modulation fidelity metric that is calibrated to provide an estimate of delay spread. If the delay spread evaluation reveals a low delay spread condition, the baseband digital data signal is filtered using a narrow filter having a center frequency. Where the evaluation determines the existence of a high delay spread condition, the baseband signal is instead filtered using a wide bandwidth filter having the center frequency and a bandwidth wider than the narrow filter. The center frequency of the wide bandwidth filter is selectively shifted in accordance with a predetermined frequency offset if the interfering RF signal received power level exceeds the desired RF signal received power level by a predetermined threshold amount. An exception is where relatively powerful interfering signals are present on both higher and lower adjacent frequencies as compared to the desired RF signal, in which case a narrow filter is used during a high delay spread condition.

The invention also concerns a radio receiver. The receiver includes an RF receiving circuit configured to receive a desired RF signal on a main channel and a demodulator configured to demodulate the desired RF signal to extract therefrom a baseband digital data signal. A filter bank is provided to isolate the desired RF signal received on the main channel from interfering RF signal received on adjacent channels which are adjacent to the main channel but offset in frequency as compared to the main channel by a predetermined channel spacing. The receiver also includes at least one processor device. The at least one processor device is configured to perform various functions. The processor device determines the power level of the desired RF signal and determines the power levels of possible interfering RF signals on the upper and lower adjacent channels. The processor device evaluates a delay spread environment to determine if the first RF signal is being received under conditions of low delay spread or high delay spread. The processor device is configured so that, in the low delay spread condition, it causes the baseband digital data signal to be filtered using a narrow filter having a center frequency. Upon the occurrence of a high delay spread condition, the baseband signal is caused to be filtered using a wide filter having the center frequency and a bandwidth wider than the narrow filter. The processor device is configured to selectively cause the center frequency of the filter to shift in accordance with a predetermined frequency offset if the interfering RF signal power level exceeds the desired RF signal received power level by a predetermined threshold amount. The frequency shift of the main channel filter is optimized to reduce interference on either side of the main channel while maintaining high performance in the severe simulcast environment.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
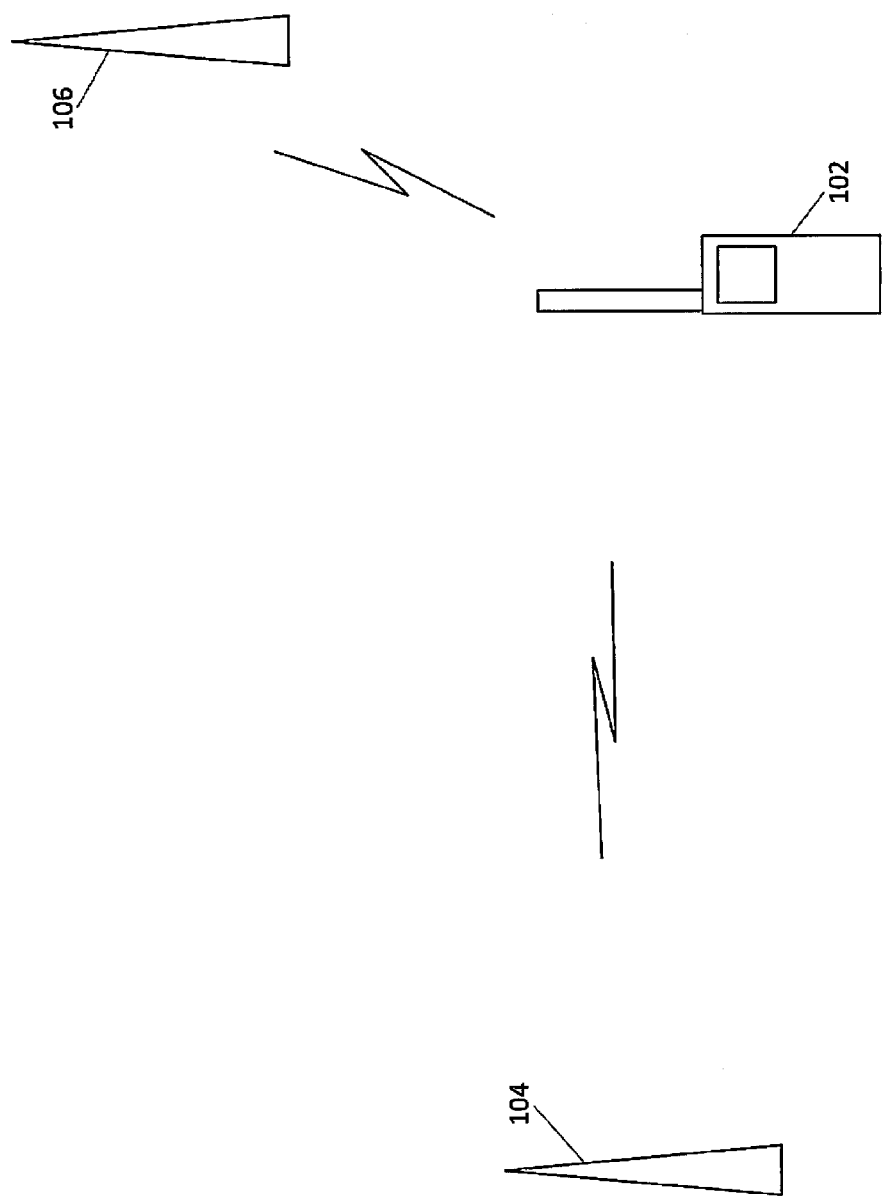
FIG. 1 is a drawing that is useful for understanding an exemplary simulcast transmission system.

Referring now to FIG. 1, there is shown an exemplary simulcast communication system in which a plurality of transmitters 104, 106 simultaneously transmit identical data signals at the same frequency $f_0$. The transmitters 104, 106 are positioned at geographically diverse locations such that a desired transmitted signal coverage is provided throughout a particular geographical area 101. A simulcast communication system as described herein is advantageously configured for ensuring that a mobile communication unit 102 will be able to receive a transmitted signal anywhere within a large or irregularly shaped geographic area. Although there are many advantages associated with simulcast communication systems, it is known that a receiver (e.g. a receiver in a mobile transceiver unit 102) can experience interference issues due to the fact that multiple transmitters are transmitting on the same frequency. Although such transmitters 104, 106 are transmitting the same digital data signal, the signal from each transmitter can be received at mobile unit 102 at a slightly different time due to differences in distance between the mobile transceiver unit 102 and each transmitter 104, 106. Delay spread is a key parameter of such interference and refers to the timing difference between the two received signals.

Figure 2:
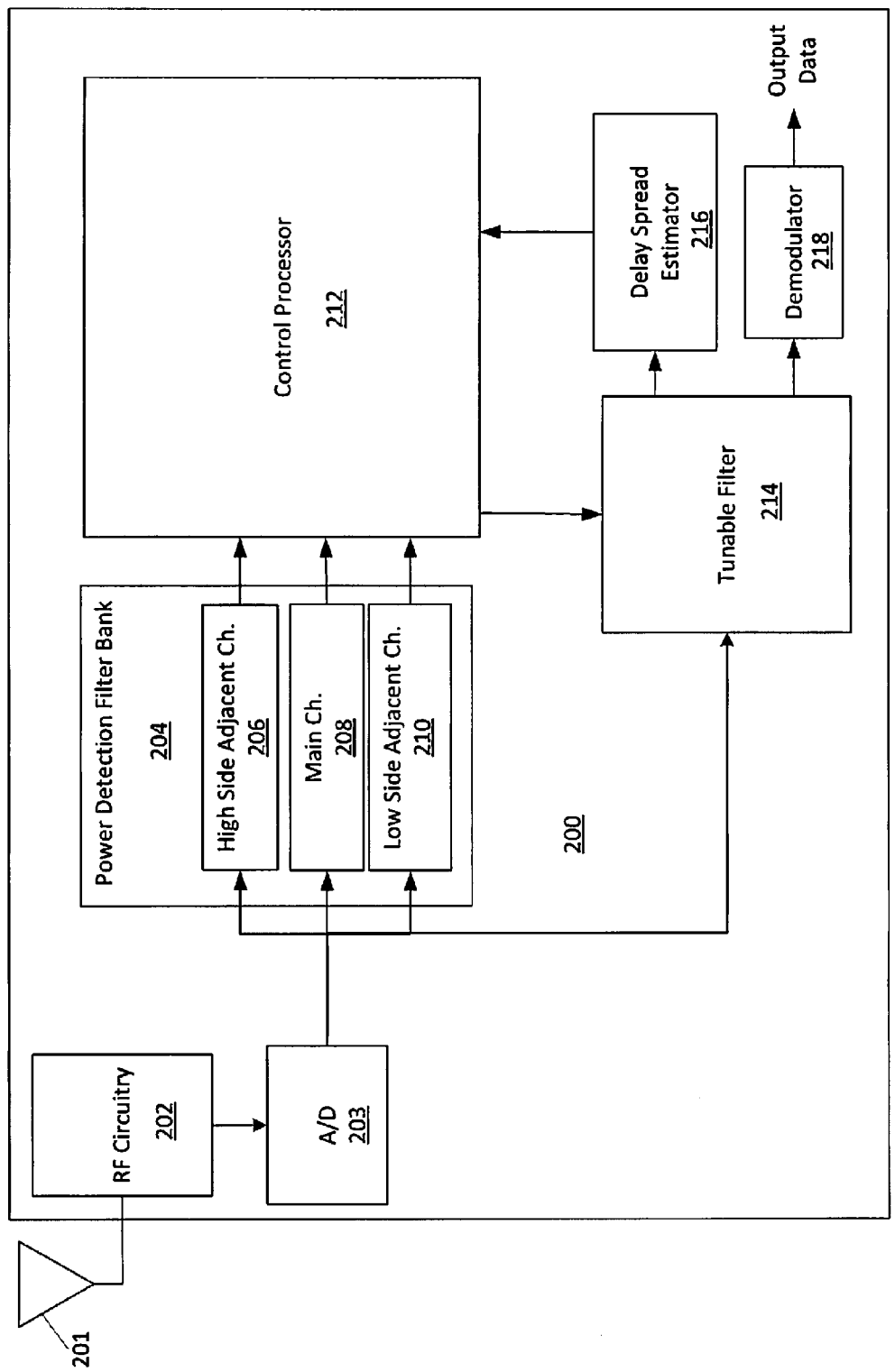
FIG. 2 is a drawing that is useful for understanding a radio receiver in which improved receiver delay spread performance is obtained in a simulcast communication environment.

Receiver filter bandwidths can have a significant impact upon the ability of a receiver to tolerate delay spread in signals received simultaneously from multiple transmitters. Wider bandwidth receiver filters allow the receiver to tolerate greater amounts of delay spread, while maintaining acceptable bit error rates. Notwithstanding such benefits, a relatively wide receiver bandwidth will have a negative effect upon the ability of the receiver to reject adjacent channel interference and thermal noise outside the spectrum of the desired signal. Accordingly, the receiver bandwidth selected for a receiver in such scenarios is often a compromise and results in compromised performance. In order to overcome such deficiencies, there is shown in FIG. 2 a radio receiver capable of providing improved delay spread performance. The radio receiver implements a process as shown in FIG. 3 in which digital data filtering is selectively modified in accordance with certain conditions as hereinafter described.

As shown in FIG. 2, one or more RF signals can be received by receiver 200 at an antenna 201. The RF signals are processed using RF circuitry 202 and converted from analog to digital form using A/D converter 203. The A/D converter outputs digital data comprising one or more of the RF channels received by the receiver. For example, a respective digital data stream can include a main channel, a high side adjacent channel, and a low side adjacent channel. The received high side adjacent channel is offset higher in frequency as compared to the main channel by a predetermined channel spacing. Similarly, the low side adjacent channel is offset lower in frequency as compared to said main channel by said predetermined channel spacing. In a simulcast communication system, received RF signals may or may not be present on the high side adjacent channel and/or the low side adjacent channel while such signals are being received on the main channel. The digital data is communicated to a power detection filter bank 204 and a tunable filter 214.

Figure 3:
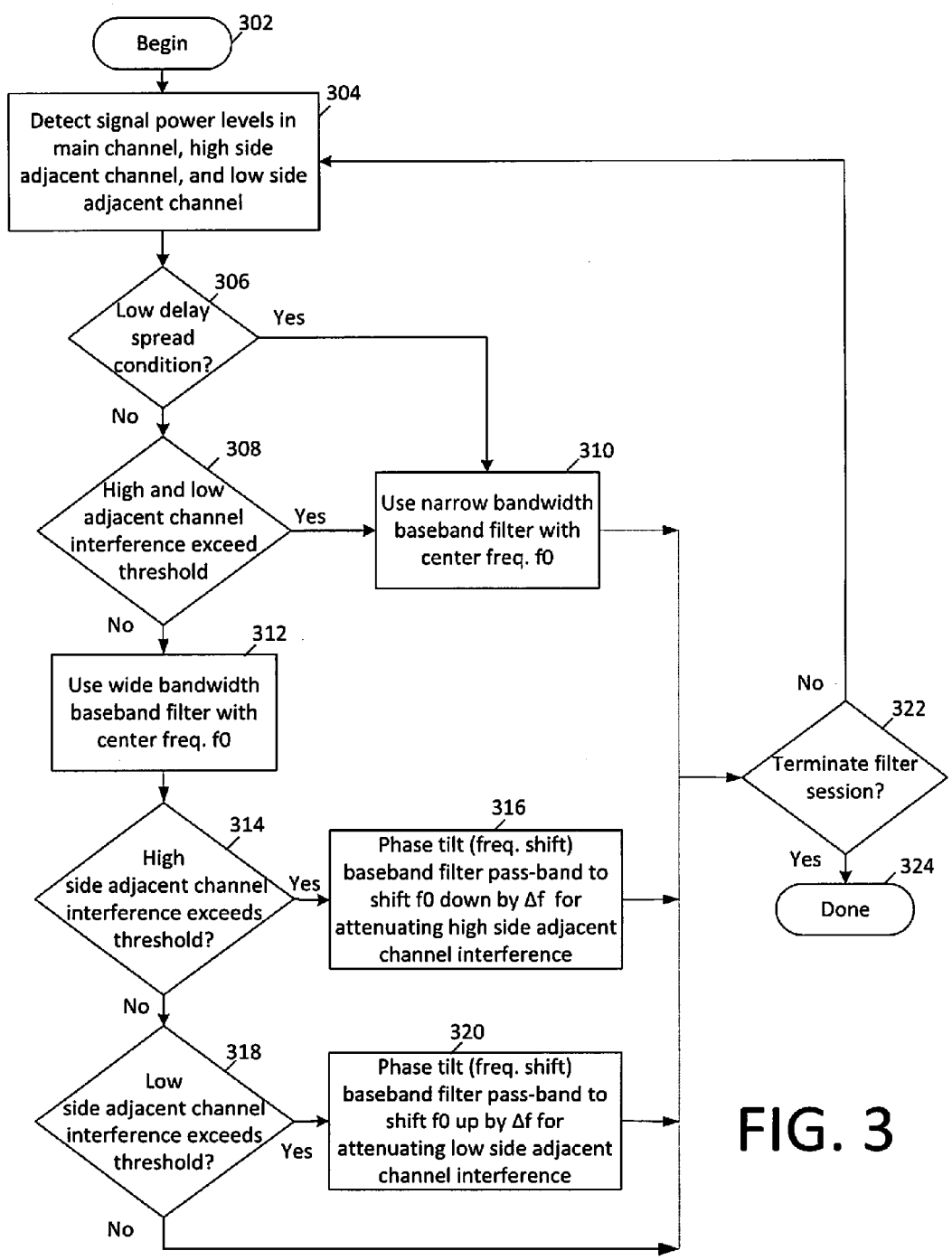
FIG. 3 is a flowchart which is useful for understanding a process implemented in the receiver shown in FIG. 2 for obtaining improved delay spread performance.

Referring now to FIG. 3, a process for improving delay spread performance can begin in step 302 after the RF signals comprising the main channel, the high said adjacent channel and the low side adjacent channel have been converted to digital format (e.g. using A/D converter 203). The process continues with step 304 in which signal power levels are detected in the main channel, a high side adjacent channel and a low side adjacent channel. In the exemplary embodiment shown in FIG. 2, power detection filter bank 204 is provided to facilitate the channel power detection process by isolating digital data signals in each of a main channel, a high side adjacent channel and a low side adjacent channel. As such, the power detection filter bank 204 includes a plurality of filters for isolating the respective channels. For example, the filter bank can include a main channel filter 208, a high side adjacent channel filter 206, and a low side adjacent channel filter 210.

Low complexity filters, such as digital infinite impulse response (IIR) filters can be used for the power detection filter bank since group delay is not important when measuring power. Of course, the invention is not limited to IIR filters and other types of filters can also be used for this purpose. Also, it may be noted that in FIG. 2 the power detection filter bank is shown separate from the control processor 212. Those skilled in the art will appreciate that such filters can optionally be implemented as part of a control processor 212. Regardless of the power detection filter bank implementation, the data from each channel is made available to the control processor 212 for further processing.

The process continues in step 306 in which a determination is made with regard to the delay spread environment which exists with respect to the main channel. As shown in FIG. 2, the delay spread can be measured using a delay spread estimator 216 at the output of a tunable filter 214. The tunable filter receives digital data from the A/D converter and filters such data in accordance with a filter transfer function before passing the data along to the delay spread estimator. The delay spread estimate obtained by the delay spread estimator can be communicated to the control processor 212. Although the delay spread estimator is shown in FIG. 2 as separate from the control processor, the functions of the delay spread estimator can optionally be integrated into the control processor 212.

Delay spread can be relatively low or relatively high depending on the particular radio communication environment. For example, delay spread conditions can range from low (e.g., substantially zero time difference between timing of identical signals received from different sources), to high (e.g. 115 microseconds). A relatively large receiver bandwidth is needed to optimize performance in a high delay spread environment, whereas a somewhat narrower receiver bandwidth can be used where there is only a low amount of delay spread. Accordingly, in step 306 delay spread detected in the main channel is evaluated to determine whether satisfactory receiver performance can be achieved using a relatively narrow bandwidth filter. A relatively narrow bandwidth filter is preferred when low delay spread conditions permit because the narrower bandwidth offers improved ability to reject adjacent channel interference as compared to a wider bandwidth filter. If low delay spread conditions are found to exist (306: Yes), then a narrow bandwidth filter is selected for the receiver in step 310. The narrow bandwidth filter will have a center frequency f0, which will generally be coincident with the center frequency of the main channel. The actual bandwidth of the narrow bandwidth filter can be selected by a designer. However, the narrow bandwidth filter advantageously has a bandwidth that is optimized for flat fading conditions when thermal noise is the limiting environmental condition. As known in the art, flat fading is a type of fading in a communications channel that attenuates or fades all frequencies in the channel in the same amount. In the present invention, the filter is optimized for flat fading by making the filter bandwidth equal to the frequency range over which the desired signal spectrum is above the noise floor spectrum at the signal level where minimum sensitivity (i.e. lowest SNR that provides a desired level of performance) is achieved. A bandwidth higher than this would let in more noise than necessary, whereas a bandwidth lower than this would cut off valuable signal energy. In severe delay spread conditions the signal level is typically much higher than the minimum sensitivity level and a wider filter bandwidth can be used to optimize performance since time delay interference is causing the performance degradation and not thermal noise.

Figure 4:
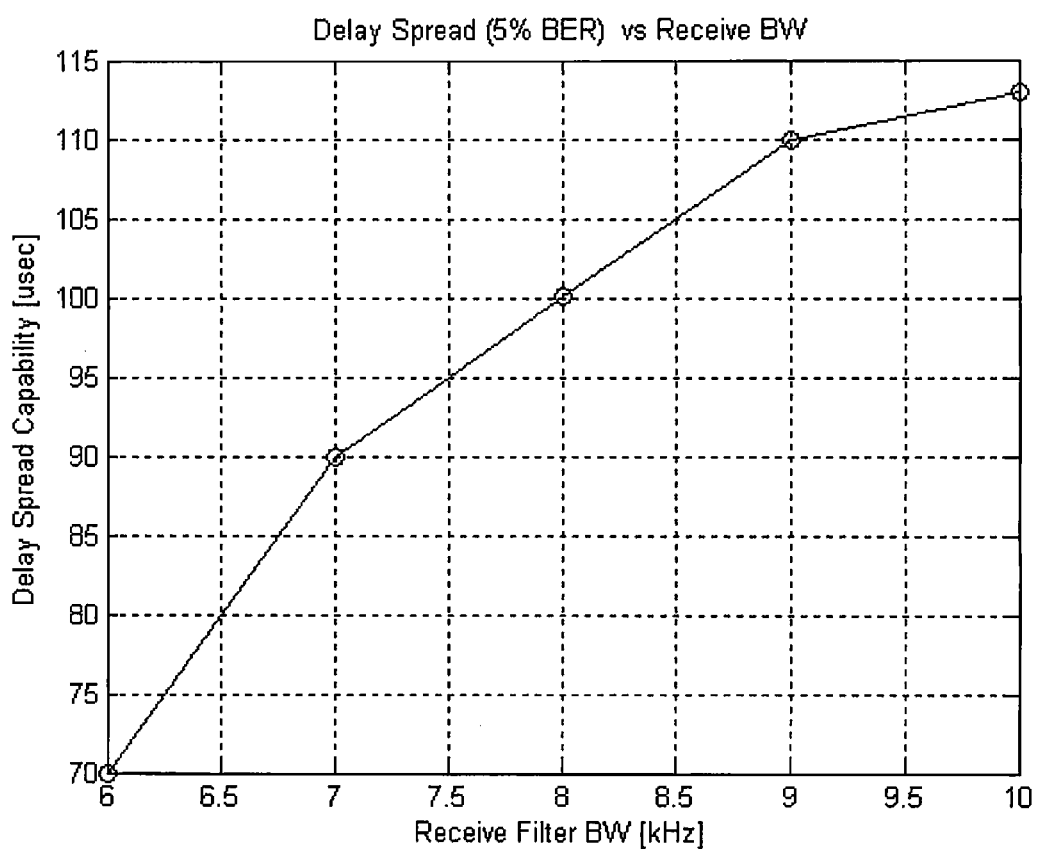
FIG. 4 is a plot which is useful for understanding a relationship between delay spread capability and receive filter bandwidth.
Figure 5:
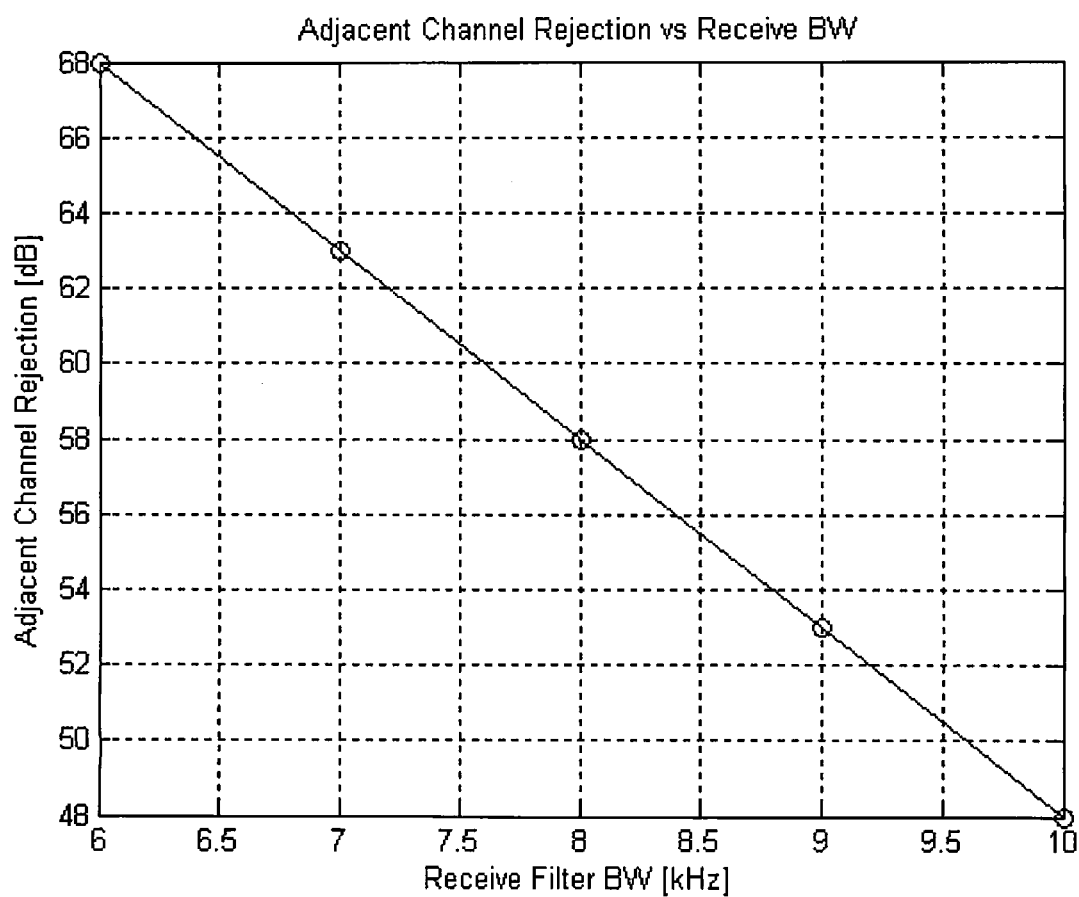
FIG. 5 is a plot which is useful for understanding a relationship between adjacent channel rejection and receive filter bandwidth.

It will be appreciated that "low delay spread" and "high delay spread" are relative terms and that a designer can determine when delays spread is sufficiently "low" in a particular communication system so that a relatively narrow bandwidth filter can be used. In order to understand this concept more completely, there is shown in FIG. 4 a plot of receiver delay spread capability versus receiver bandwidth at a 5% bit error rate (BER). In FIG. 5 there is shown a plot of adjacent channel rejection versus receive bandwidth. The example plots are for a P25, phase 2 communication system using $\pi/4$ DQPSK modulation operating at 6 ksym/sec with a standard C4FM interference pattern. It can be observed from FIG. 4 that delay spread capability of up to 80 microseconds can be provided using a receiver filter bandwidth of 6.5 kHz, whereas relatively higher amounts of delay spread (e.g. 80 to 115 microseconds in this example) would require a filter having a bandwidth of about 10 kHz. Accordingly, a designer in this scenario could choose a 6.5 kHz filter for relatively low delay spread conditions (e.g. less than 50 microseconds) and could choose a 10 kHz filter for relatively high delay spread conditions (e.g., greater than 50 microseconds). As will be noted with respect to FIG. 5, a receiver using the higher bandwidth 10 kHz filter will be much less tolerant to adjacent channel signal rejection as compared to a receiver using the 6.5 kHz filter. Of course, the invention is not limited to any particular definition of what conditions qualify as low delay spread or high delay spread. Instead, these conditions are to be selected by the system designer based on comparisons of plots similar to those shown in FIGS. 4 and 5.

Referring once again to FIG. 3, if low delay spread conditions are not present (306: No) the process continues on to 308 where a determination is made as to whether high side adjacent channel interference and low side adjacent channel interference are both present. This determination can be made by evaluating a signal power of RF signals contained in the high side adjacent channel and the low side adjacent channel. If both channels contain RF signals at power levels that exceed a threshold value (308: Yes) then this will serve as an indication that a narrow bandwidth filter is needed for the main channel. The threshold value or values selected for use in step 308 can be determined by a designer based on computer modeling of receiver BER performance in conditions of adjacent channel interference. Advantageously, the threshold value can be set dynamically based on the measured power of the RF signal contained in the main channel. For example, in an embodiment of the invention, the threshold value $T_N$ can be defined as $T_N$=P0+40 dB, where P0 is the measured power of the signal received in the main channel. Accordingly, whenever the power level of RF signals received in the high side adjacent channel and the low side adjacent channel both exceed $T_N$, the narrow filter will be selected at 310. Of course, other threshold values can also be selected for $T_N$.

The narrow bandwidth filter selected at 310 will have a center frequency of f0, which will generally be equal to the center frequency of the main channel. Notably, in those instances where there is relatively high delay spread (306: No) the narrow bandwidth filter selected at 310 is not truly ideal from a delay spread standpoint. In such a scenario, a wider bandwidth filter would be desirable from the standpoint of improving delay spread performance. Still, the existence of relatively high levels of interference in both the high side adjacent channel and the low side adjacent channel preclude the use of a wider bandwidth filter which could otherwise offer greater delay spread capability.

In an embodiment of the invention shown in FIG. 2, the narrow bandwidth filter referenced in step 310 can be implemented using the tunable filter 214 as shown. The tunable filter 214 can be a digital filter controlled by selecting one or more filter parameters to obtain a desired filter transfer function. More particularly, the selection of filter parameters can be used to control at least a bandwidth and a center frequency of the filter 214. The selection of filter parameters and hence the filter transfer function can be determined and selected by the control processor 212. Control of the tunable filter will be discussed below in greater as the description of the invention progresses.

If it is determined at 308 that the high and low side adjacent channel interference are not both above a predefined threshold value (308: No) then the process continues on to step 312 in which a wide bandwidth filter is selected with center frequency f0. As noted above, f0 will generally be coincident with the center frequency of the main channel. The wide bandwidth filter transfer function can be predetermined by a designer in accordance with the criteria discussed above with respect to FIGS. 4 and 5. However, it should be understood that the wide bandwidth filter applied at 312 will have a wider bandwidth as compared to the narrow bandwidth filter referenced in step 910. For example, the narrow bandwidth filter could be a 6.5 kHz filter whereas the wide bandwidth filter could have a bandwidth of 10 kHz. The wide bandwidth filter referenced in step 312 can be implemented using the tunable filter 214 as previously described, wherein the selection of filter parameters can be used to control at least a bandwidth and a center frequency of the filter. The selection of filter parameters and hence the filter transfer function can be determined and selected by the control processor 212.

The process continues at 314 where a determination is made as to whether high side adjacent channel interference exceeds a predetermined threshold $T_H$. If so, (314: Yes) then the process continues to 316 at which a phase tilt or frequency shift is applied to the wide bandwidth filter referenced in step 312. The frequency shift or phase tilt causes the center frequency f0 to shift in frequency in accordance with a frequency offset ($-\Delta f$). More particularly, the center frequency f0 is shifted lower in frequency which action enhances the attenuation of the high side adjacent channel interference. The overall bandwidth of the wide bandwidth filter can advantageously remain substantially unchanged while the center frequency of the filter is shifted. In the embodiment shown in FIG. 2, the center frequency shift of the filter (i.e. filter 214) in step 316 can be controlled in accordance with filter parameters specified by the control processor 212.

Figure 7A:
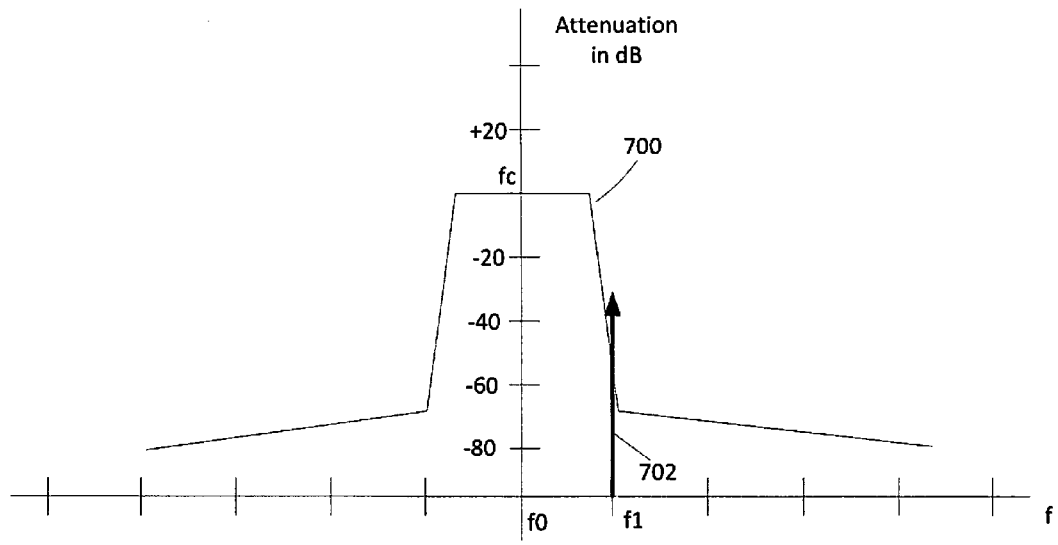
FIGS. 7A and 7B are useful for understanding how a frequency shift of a filter center frequency can cause increased attenuation to an signal in an adjacent channel.
Figure 7B:
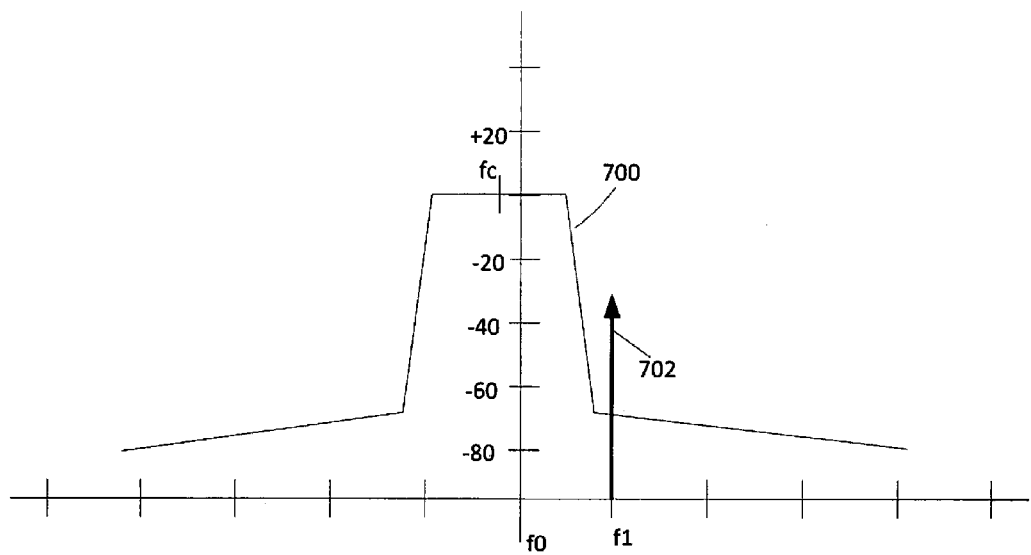

The frequency shift and associated attenuation achieved at 316 can be best understood with reference to FIGS. 7A and 7B. As shown in FIG. 7A, a filter passband 700 can have a center frequency fc=f0. If a signal at f1 in an adjacent channel is causing interference on a main frequency at f0, the center frequency of the filter fc can be offset lower in frequency as shown in FIG. 7B. By offsetting the center frequency in this way, the interfering signal 702 is subjected to an increased amount of attenuation as shown.

Referring once again to FIG. 3, if the high side adjacent channel interference does not exceed the predetermined threshold value $T_H$, then the process continues at 318 where a determination is made as to whether the low side adjacent channel interference exceeds a threshold value $T_L$. If so (318: Yes), then the process continues to step 320 where a phase tilt or frequency shift is applied to the wide bandwidth filter. The frequency shift or phase tilt causes the center frequency f0 to shift in frequency in accordance with a frequency offset (+Δf). More particularly, the center frequency f0 is shifted higher in frequency, which action enhances the attenuation of the low side adjacent channel interference. The bandwidth of the filter can remain unchanged as the center frequency is shifted as described herein. As noted above, the center frequency shift of the filter can be controlled in accordance with filter parameters specified by the control processor 212.

The value of Δf in steps 316 and 320 can be selected by a designer to achieve a desired balance with regard to attenuation of the adjacent channel signal while minimizing negative impact upon receiver performance. In some embodiments, the value of Δf can be chosen to be 1 kHz, 2 kHz, or 3 kHz. Still, the invention is not limited in this regard and other values of Δf are also possible. Optimal selection of filter shift values can be based on computer modeling so as to achieve an increase in attenuation of the interfering channel without significant loss of delay spread performance.

Suitable values for the predetermined threshold values $T_H$ and $T_L$ can also be determined by computer modeling of the communication system. For example, modeling can be used to determine a difference in signal power as between signals received in an adjacent channel and a main channel which is sufficient to cause an increase in the bit error rate (BER). As an example, an exemplary receiver may begin to show a significant increase in BER when a power level PH in a high side adjacent channel is more than 40 dB greater than a power level in a main channel P0. Accordingly, the threshold value can be chosen in that scenario to be $T_H$=P0+40 dB. Stated differently, a center frequency of the wide bandwidth filter will be shifted by an amount Δf when PH>P0+40 dB. A similar technique can be used to select threshold value $T_L$. For example, a center frequency of the wide bandwidth filter can be shifted by an amount Δf when PL>P0+40 dB where $T_L$=P0+40 dB. Notably, the threshold values of $T_H$ and $T_L$ in such a scenario will vary dynamically in accordance with the power level of received signals in the main channel.

After an appropriate filter configuration has been selected in one of steps 310, 316 or 320, a determination is made at 322 as to whether the filter session is to be terminated. If the session is to continued (322: No) then the process returns to 304 where power levels in the respective main, high side adjacent channel and low side adjacent channel are monitored. The process continues in this way until the filter session is terminated (322: No) at which point the process is ended at 324.

Figure 6:
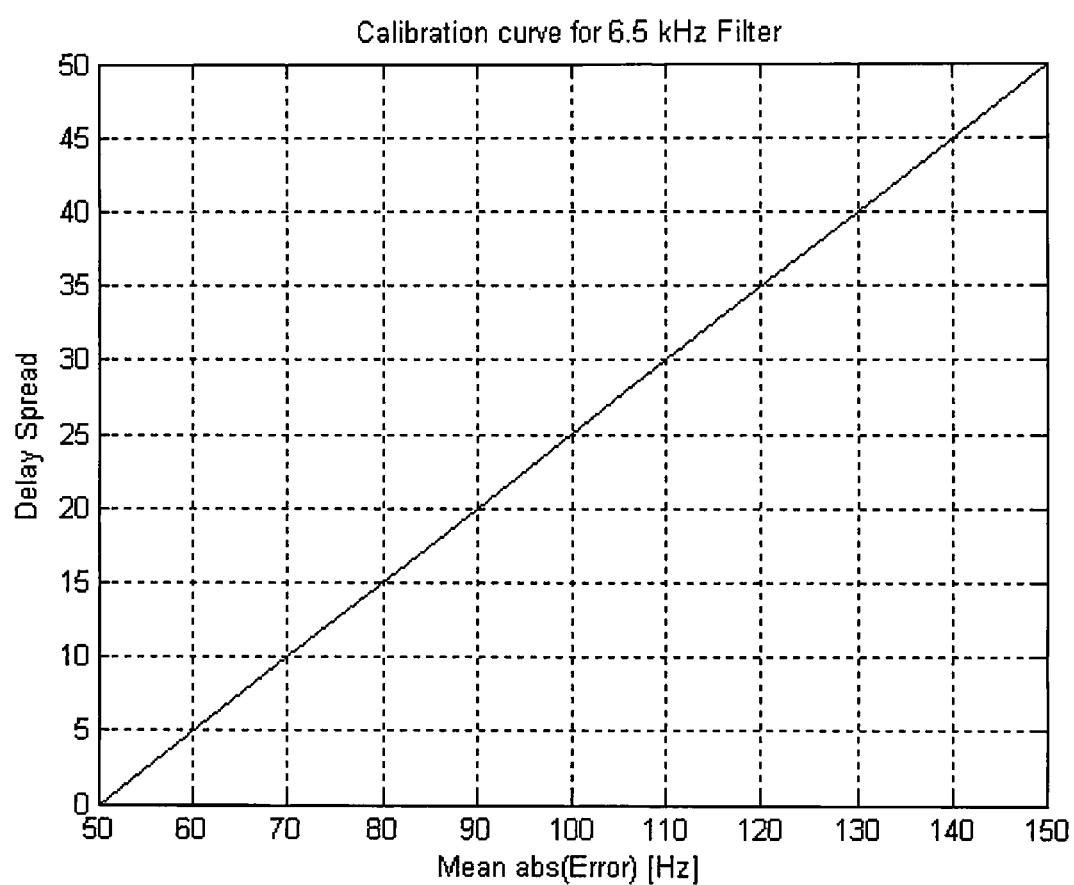
FIG. 6 is a plot which is useful for understanding how a mean of the absolute value of the error between the measured and known symbol frequency can be used as a metric for estimating delay spread.

Delay spread can be estimated using any suitable method. According to one aspect of the present invention, delay spread can be estimated based upon a metric related to modulation fidelity. For example, the delay spread in a channel can be estimated using the mean of the absolute value of the frequency error between the measured and known symbol frequencies. For example, the symbol frequencies for π/4 DQPSK at 6 ksym/s are +/−2250 Hz and +/−750 Hz which correspond to differential phase shifts of +/−3π/4 and +/−π/4 at a symbol rate of 6 ksym/s. When the receiver samples the FM signal at the optimal sample point in strong signal with no delay spread the value measured will be very close to one of the four frequencies listed above, with the closest chosen as the demodulated symbol. As noise increases or delay spread increases the error between the measured frequencies and the known symbol frequencies increase and a mean estimate of the absolute error can be used to estimate actual delay spread when the signal level is high and the error is due to the received signal having large delay spread and not due to thermal noise. This concept is illustrated in FIG. 6 which shows that the foregoing metric varies in a predictable way with respect to delay spread. Accordingly, the mean of the absolute value of the error between the measured and known symbol frequencies can serve as an effective way to estimate delay spread.

As noted above, a tunable filter 214 can be used to selectively vary a receiver bandwidth and center frequency in accordance with a plurality of filter parameters specified by the control processor. Accordingly, in those instances where a narrow bandwidth filter is used (e.g. as referenced in step 310) a filter transfer function $h(k)=h_N(k)$ can be used to provide a desired narrow bandwidth filter response, having center frequency f0, where k is the index of each filter tap and the parameter values for filter taps h(k) can be determined by the control process 212 as described herein. Alternatively, in those instances where a wide bandwidth filter is necessary, a filter function $h(k)=h_w(k)\exp(j\Delta\Phi*k)$ can be used, where $\Delta\Phi=2*\pi*f_{offset}*T_s$ where ΔΦ is the phase shift in radians that is needed every sample interval, Ts, to provide a frequency shift of $f_{offset}$ $f_{offset}$ is the desired frequency offset Δf; and $T_s$ is the sampling interval of the digital signal processor. For example, for a symbol rate of 6 ksym/s and a symbol oversample rate of 10, the sampling frequency of the digital signal processor would the 60 kHz and Ts=1/60 kHz (~0.0167 ms). Such a filter can have a desired filter response with a wider bandwidth as compared to the narrow bandwidth filter $h_N(k)$. With the wider bandwidth filter $h_w(k)$ a different set of filter taps are used to implement a filter having a wider bandwidth. Moreover, a different value of ΔΦ can be used to shift the center frequency f0 in accordance with a frequency offset.

After the digital data stream has been filtered as described herein, the data stream is communicated to a demodulator 218 as shown in FIG. 2. The demodulator will extract the transmitted symbols which have been communicated from the transmitter, after which the symbols can be processed further in accordance with a particular data transmission protocol in use by the communication system.

As shown in FIG. 2, the methods described herein can be realized in a radio receiver incorporating a processing device. Alternatively, the methods can be realized in a general purpose computer system or several interconnected computer systems. Any kind of computer system or other apparatus adapted for carrying out the methods described herein is suited. For example, a general-purpose computer system can have a computer program that can control the computer system such that it carries out the methods described herein.

The processes described herein can also take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Although the invention has been illustrated and described with respect to one or more implementations, equivalent alterations and modifications will occur to others skilled in the art upon the reading and understanding of this specification and the annexed drawings. For example, the invention has been described with respect to an implementation having a narrow bandwidth filter and a wide bandwidth filter. However, the inventive arrangements are not limited to a system in which only two filter bandwidth options (i.e., wide/narrow). Other options are also possible. For example, a third filter having an intermediate bandwidth (i.e. a bandwidth greater than the narrow bandwidth filter but narrower than the wide bandwidth filter) can be provided. Such an intermediate bandwidth filter could be used in those situations where there exists moderately high levels of delay spread and moderate levels of interference from adjacent channels. The center frequency f0 of the third or intermediate bandwidth filter can be fixed. However, in an alternative embodiment, the center frequency of such intermediate bandwidth filter can optionally be shifted in an amount determined by a frequency offset using techniques similar to those described herein with respect to the wide bandwidth filter. The frequency offset used for the moderate bandwidth filter could be the same or different as compared to the wide bandwidth filter. As with the previously described narrow and wide bandwidth filters, the intermediate bandwidth filter could be implemented in a tunable filter 214.

Also, the frequency offset of the filer center frequency (Δf) herein has been described thus far as a fixed value (e.g. 2 kHz). However, it should be appreciated that the frequency offset need not be a fixed value. Instead, an amount of frequency offset can be selectively varied based on conditions. For example, in some embodiments of the invention, the amount of frequency offset applied to the center frequency of the filter can be determined based on a variety of factors including but not limited to the levels of interference detected in adjacent RF channels, the BER, and delay spread conditions.

Although the various filter implementations have been described herein with regard to a single filter having a variable transfer function, the invention is not limited to such an implementation. For example, rather than using a single tunable filter, a plurality of filters can be used, each having a different transfer function. A switching bank can be used to route the digital data to the appropriate filter under the control of a control processor. Accordingly, the digital data can be filtered using a selected filter with the desired bandwidth and center frequency.

In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

I claim:

1. A method for optimizing the delay spread capability of a radio receiver device, comprising:
   receiving at said radio receiver device a desired RF signal on a main channel;
   demodulating in said radio receiver device said desired RF signal to extract therefrom a baseband digital data signal;
   evaluating in said radio receiver device a delay spread environment to determine if said desired RF signal is being received under conditions of low delay spread or high delay spread;
   determining in said radio receiver device a first received power level of said desired RF signal on said main channel;
   determining in said radio receiver device a second received power level of at least one interfering RF signal received on an adjacent channel which is adjacent to said main channel but offset in frequency as compared to said main channel by a predetermined channel spacing;
   in said low delay spread condition, filtering in said radio receiver device said baseband digital data signal using a narrow filter having a center frequency;
   in a high delay spread condition, filtering in said radio receiver device said baseband signal using a wide filter having said center frequency and a bandwidth wider than said narrow filter, and selectively shifting said center frequency in accordance with a predetermined frequency offset if said second received power level of said at least one interfering RF signal exceeds said first received power level by a predetermined threshold amount.

2. The method according to claim 1, wherein said predetermined frequency offset is selected to cause an increase in attenuation of said interfering RF signal by said wide filter in said adjacent channel.

3. The method according to claim 2, wherein said adjacent channel is at least one of a high side adjacent channel which is offset higher in frequency as compared to said main channel by said predetermined channel spacing, and a low side adjacent channel which is offset lower in frequency as compared to said main channel by said predetermined channel spacing.

4. The method according to claim 3, further comprising in said high delay spread condition, filtering said baseband signal using said narrow filter if said second received power level of said interfering RF signal received on said high side adjacent channel, and a third received power level of a third RF signal received on said low side adjacent channel both exceed said first received power level by a predetermined threshold amount.

5. The method according to claim 3, wherein said center frequency is shifted lower in frequency if said interfering RF signal is received on said high side adjacent channel, and is shifted higher in frequency if said interfering RF signal is received on said low side adjacent channel.

6. The method according to claim 1 wherein said center frequency is shifted in accordance with said predetermined frequency offset by phase-tilting the filter passband.

7. The method according to claim 1, wherein said narrow filter has a bandwidth that is optimized for flat fading conditions, and said wide filter is optimized for high delay spread conditions.

8. The method according to claim 1, further comprising using the mean of the absolute value of the error between a measured symbol frequency and a known symbol frequency to determine when the radio receiver is in a high delay spread condition.

9. A radio receiver, comprising:
an RF receiving circuit configured to receive a desired RF signal on a main channel;
a demodulator configured to demodulate said desired RF signal to extract therefrom a baseband digital data signal;
a filter bank configured to isolate said desired RF signal received on said main channel from at least one interfering RF signal received on an adjacent channel which is adjacent to said main channel but offset in frequency as compared to said main channel by a predetermined channel spacing;
at least one processor device configured to
determine a first received power level of said desired RF signal and determine at least a second received power level of at least said interfering RF signal;
evaluate a delay spread environment to determine if said desired RF signal is being received under conditions of low delay spread or high delay spread;
in said low delay spread condition, cause said baseband digital data signal to be filtered using a narrow filter having a center frequency;
in said high delay spread condition, causing said baseband signal to be filtered using a wide filter having said center frequency and a bandwidth wider than said narrow filter, and selectively causing said center frequency to shift in accordance with a predetermined frequency offset if said second received power level exceeds said first received power level by a predetermined threshold amount.

10. The radio receiver according to claim 9, wherein said predetermined frequency offset causes an increase in attenuation of said interfering RF signal by said wide filter in said adjacent channel.

11. The radio receiver according to claim 10, wherein said adjacent channel is at least one of a high side adjacent channel which is offset higher in frequency as compared to said main channel by said predetermined channel spacing, and a low side adjacent channel which is offset lower in frequency as compared to said main channel by said predetermined channel spacing.

12. The radio receiver according to claim 11, wherein said processor device is further configured when said high delay spread condition is detected, to cause said baseband signal to be filtered using said narrow filter if said second received power level of said interfering RF signal received on said high side adjacent channel, and a third received power level of a third RF signal received on said low side adjacent channel both exceed said first received power level by a threshold amount.

13. The radio receiver according to claim 11, wherein said processor device is configured to cause said center frequency to shift lower in frequency if said interfering RF signal is received on said high side adjacent channel, and to shift higher in frequency if said interfering RF signal is received on said low side adjacent channel.

14. The radio receiver according to claim 9 wherein said processor device is configured to cause said center frequency to shift in accordance with said predetermined frequency offset by phase-tilting the filter passband.

15. The radio receiver according to claim 9, wherein said narrow filter has a bandwidth that is optimized for flat fading conditions and said wide filter is optimized for high delay spread conditions.

16. The radio receiver according to claim 9, wherein said delay spread environment is evaluated using the mean of the absolute value of the error between a measured symbol frequency and a known symbol frequency.

* * * * *